United States Patent
Huang et al.

(10) Patent No.: US 11,692,518 B2
(45) Date of Patent: Jul. 4, 2023

(54) CONTROLLING METHOD OF VEHICLE EXHAUST GAS RECIRCULATION, APPARATUS, AND ELECTRONIC DEVICE

(71) Applicant: GUANGZHOU AUTOMOBILE GROUP CO., LTD., Guangzhou (CN)

(72) Inventors: Xinglai Huang, Guangzhou (CN); Kai Zhang, Guangzhou (CN); Zhixin Zeng, Guangzhou (CN); Guanghua Zhong, Guangzhou (CN); Ning Zhang, Guangzhou (CN); Linggui Zhong, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 0 days.

(21) Appl. No.: 17/787,660

(22) PCT Filed: Jun. 12, 2021

(86) PCT No.: PCT/CN2021/099899
§ 371 (c)(1),
(2) Date: Jun. 21, 2022

(87) PCT Pub. No.: WO2022/017060
PCT Pub. Date: Jan. 27, 2022

(65) Prior Publication Data
US 2022/0412293 A1 Dec. 29, 2022

(30) Foreign Application Priority Data

Jul. 21, 2020 (CN) .......................... 202010705618.3

(51) Int. Cl.
*F02M 26/33* (2016.01)
*F02M 26/15* (2016.01)
(Continued)

(52) U.S. Cl.
CPC ............ *F02M 26/33* (2016.02); *F02M 26/15* (2016.02); *F02M 26/28* (2016.02); *F02M 26/30* (2016.02); *F02M 26/32* (2016.02); *F02M 26/06* (2016.02)

(58) Field of Classification Search
CPC ........ F02M 26/33; F02M 26/15; F02M 26/32; F02M 26/06; F01N 3/021
See application file for complete search history.

(56) References Cited

U.S. PATENT DOCUMENTS

2016/0290288 A1* 10/2016 LaPointe ................. F02M 26/06
2016/0319779 A1* 11/2016 LaPointe ................. F01N 3/101

FOREIGN PATENT DOCUMENTS

RU 146389 U1 * 10/2014 ............... F01N 3/10

* cited by examiner

*Primary Examiner* — Ngoc T Nguyen
(74) *Attorney, Agent, or Firm* — ScienBiziP, P.C.

(57) ABSTRACT

A controlling method of vehicle exhaust gas recirculation, an apparatus and an electronic device are provided in vehicle field. Before the GPF/DPF starts to work, controlling the EGR to cool the temperature of the recycled gas at a lowest gas temperature required being entranced into the engine; and after the GPF/DPF starts to work, according to a gas temperature change and an intake flow change of an air intake of the EGR, adjusting an opening of a valve arranged in a vent of the EGR and a working power of a pump arranged in a liquid duct of the EGR, for making the EGR to cool the gas recycled by the EGR in a safe temperature range required by the engine. The controlling method is associated controlled with a cooling system of the EGR, for ensuring the recycled exhaust gas temperature and the EGR rate in a suitable range.

17 Claims, 5 Drawing Sheets

(51) Int. Cl.
  *F02M 26/32* (2016.01)
  *F02M 26/30* (2016.01)
  *F02M 26/28* (2016.01)
  *F02M 26/06* (2016.01)

CONTROLLING METHOD OF VEHICLE EXHAUST GAS RECIRCULATION, APPARATUS, AND ELECTRONIC DEVICE

The present application claims the priority of the Chinese invention patent application with the invention name "a controlling method of vehicle exhaust gas recirculation, apparatus and electronic device" submitted to the China Patent Office on Jul. 21, 2020, application No. 202010705618.3, and the whole content of which is hereby incorporated by reference.

TECHNICAL FIELD

The subject matter herein generally relates to vehicle technology field, particularly to a controlling method of vehicle exhaust gas recirculation, an apparatus and an electronic device.

BACKGROUND

A gasoline particulate filter (GPF) is a ceramic filter mounted in an emission system of a gasoline engine, it can capture particulates before the particulates enters into atmosphere. A diesel particulate filter (DPF) is a ceramic filter mounted in an emission system of a diesel engine, which captures particulates before the particulates enters into atmosphere.

For protecting environment, a standard of vehicle emission becomes higher. The limitation of the vehicle with high emission is grandly increased, and promotion of the vehicle with low emission is increased. But, an output power of the vehicle with low emission is high, which cause a temperature of burning in the engine to be high, a large amount of $NO_X$ is generated, and the environment is polluted. Thus, the emission system of the vehicle generally includes the GPF or the DPF for resolving the burned particulates exhausted by the engine, for decreasing the pollutant $NO_X$ including in the exhaust gas, and protecting the environment.

For reducing the $NO_X$ generated by the engine, most vehicle on the market uses an exhaust gas re-circulation (EGR). The EGR recirculates a part of the exhaust gas outputted by the engine back to an intake manifold, which is mixed with fresh air together and then being input into a cylinder again. Because the exhaust gas includes a large number of polyatomic gases, such as $CO_2$, and the gas, such as $CO_2$ is unable to burn because of which has a high specific heat to absorb a lot of heat, for making a highest burning temperature of the mixed gas of the cylinder to be reduced, thus the production of the $NO_X$ is reduced.

But, the GPF or DPF is used in the emission system of the vehicle, and will cause an increase of temperature while the engine burns the exhaust gas, and cause a gas flow of the exhaust gas to be increase. The GPF or DPF is independently worked with the EGR of each other, the gas processed by the GPF or DPF is recirculated to the EGR, thus the EGR also meets problems of the temperature of the gas to be raised and the gas flow of the gas to be increased, therefore the production of the $NO_X$ is hard to reduce, the work efficiency of the EGR is reduced.

SUMMARY OF THE DISCLOSURE

The present application provides a controlling method of vehicle exhaust gas recirculation, an apparatus and an electronic device, which solves or relieve one or more technology problem in the related art.

According to a one hand of the present disclosure, a controlling method of vehicle exhaust gas recirculation is provided. The GPF/DPF in the vehicle processes the gas exhausted by the engine to be outputted to the exhaust channel, and the gas exhausted by the GPF/DPF is recycled into the EGR, the EGR cools the temperature of the recycled gas by cooling coolant and exhausts into the intake channel of the engine, the method including:

before the GPF/DPF starts to work, controlling the EGR to cool the temperature of the recycled gas at a lowest gas temperature required being entranced into the engine; and after the GPF/DPF starts to work, according to a gas temperature change and an intake flow change of an air intake of the EGR, adjusting an opening of a valve arranged in a vent of the EGR and a working power of a pump arranged in a liquid duct of the EGR, for making the EGR to cool the gas recycled by the EGR in a safe temperature range required by the engine.

According to a one hand of the present application, a controlling apparatus of vehicle exhaust gas recirculation is provided. The GPF/DPF in the vehicle processes the gas exhausted by the engine to be outputted to the exhaust channel, and the gas exhausted by the GPF/DPF is recycled into the EGR, the EGR cools the temperature of the recycled gas by cooling coolant and exhausts into the intake channel of the engine, the controlling apparatus including:

a first controlling module, before the GPF/DPF starts to work, controlling the EGR to cool the temperature of the recycled gas at a lowest gas temperature required being entranced into the engine; and a second controlling module, after the GPF/DPF starts to work, according to a gas temperature change and an intake flow change of an air intake of the EGR, adjusting an opening of a valve arranged in a vent of the EGR and a working power of a pump arranged in a liquid duct of the EGR, for making the EGR to cool the gas recycled by the EGR in a safe temperature range required by the engine.

According to a one hand of the present application, an electronic device is provided, including:

at least one processor; and a storage communication connected with the at least one processor;

the storage stores instructions being implemented by the at least one processor, the instructions are implemented by the at least one processor, for enabling the at least one processor to implement the method provided by any embodiment of the present application.

According to a one hand of the present application, a non-transitory computer readable storage medium storing computer instructions is provided, the computer instructions enables the computer to implement the method provided by the embodiment of the present application.

According to the present application, the GPF/DPF is associated controlled with a cooling system of the EGR, for ensuring the recycled exhaust gas temperature and the EGR rate in a suitable range.

It is understood that, the contents described herein are not intended to identify key or important features of the embodiments of the present application, or limit the scope of the present application. Other features of the present application will be easier to be understood by the following description.

BRIEF DESCRIPTION OF THE DRAWINGS

In the drawings, like reference numerals refer to same or similar components or elements throughout the several drawings unless otherwise specified. The drawings are not necessarily drawn to scale. It should be understood that these drawings only depict some embodiments in accordance with the present application and are not to be construed as limiting the scope of the present application.

LABELS OF DRAWINGS

Intake manifold-1, engine-2, exhaust manifold-3, turbine-4, supercharger-5, GPF/DPF-6, air intake of the EGR-7, valve of the vent of EGR-8, heat exchanger-9, water pump-10, temperature sensor-11, intake system-12, intake channel-13, exhaust duct of EGR-14, high-pressure intake duct-15, low temperature cooling water pipe-16, high temperature cooling water pipe-17, radiator-18.

DETAILED DESCRIPTION

In the following, only certain exemplary embodiments are briefly described. As will be appreciated by those skilled in the art, the described embodiments may be modified in various ways without departing from the spirit or scope of the present application. Accordingly, the drawings and description are to be regarded as illustrative in nature rather than restrictive.

Figure 1:
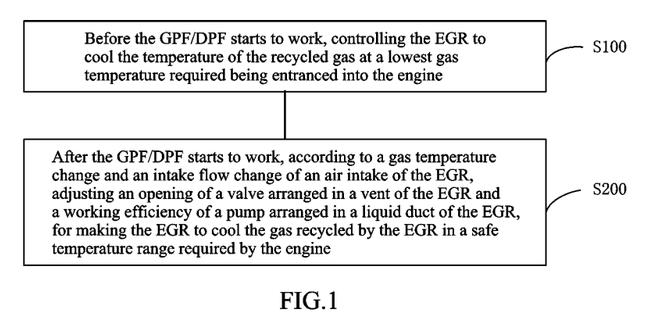
FIG. 1 is a schematic diagram according to a first embodiment of the present application.

FIG. 1 illustrates a controlling method of vehicle exhaust gas recirculation of the present application, as shown in FIG. 1, the method including:

At step S100, before the GPF/DPF starts to work, controlling the EGR to cool the temperature of the recycled gas at a lowest gas temperature required being entranced into the engine.

At step S200, after the GPF/DPF starts to work, according to a gas temperature change and an intake flow change of an air intake of the EGR, adjusting an opening of a valve arranged in a vent of the EGR and a working power of a pump arranged in a liquid duct of the EGR, for making the EGR to cool the gas recycled by the EGR in a safe temperature range required by the engine.

In the embodiment of the present application, before the GPF/DPF starts to work, the temperature of the recycled gas is pre-decreased, for avoiding the temperature of the gas recycled by the EGR to be increased at the time of the GPF/DPF starting to work. Because the GPF/DPF does have an effect of reheating the gas exhausted by the engine, the temperature of the gas processed by the GPF/DPF is relatively increased, and the flow of the gas also increased, therefore, after the GPF/DPF starts to work, the EGR executes a corresponding cooling control, namely controls the opening of the valve arranged in the vent of the EGR and the working power of the pump arranged in the liquid duct of the EGR, the temperature of the gas recycled by the EGR can be effectively controlled in a safe temperature range required by the engine, thereby the exhaust of the $NO_x$ is optimized.

Figure 2:
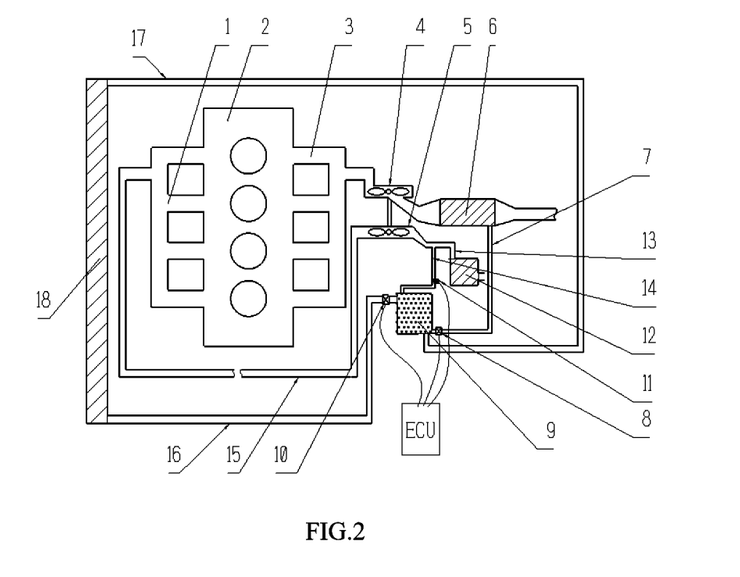
FIG. 2 is a schematic diagram according to a second embodiment of the present application.

FIG. 2 illustrates a schematic diagram of a position relationship of the GPF/DPF and the EGR in the vehicle of the embodiment of the present application. As shown in FIG. 2, the GPF/DPF is arranged in the exhaust channel, and processes of the gas exhausted by the engine which is then exhausted to the exhaust channel. The gas in the exhaust channel exhausted by the GPF/DPF can be recycled into the EGR. The cooling liquid flows through a liquid inlet of the EGR, a heat exchanger of the EGR uses the cooling liquid to cool the recycled gas, and exhausts the cooled gas into an intake channel of the engine through an exhaust opening for entering into the engine again and burning, and the cooling liquid is exhausted through a liquid outlet. The cooling liquid can be liquid capable of absorbing heat, such as tap water, seawater, and the like.

Figure 3:
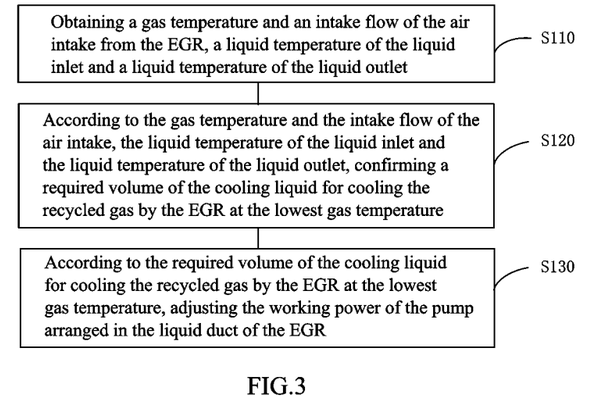
FIG. 3 a schematic diagram according to a third embodiment of the present application.

In an exemplary embodiment, in the step S100, controlling the temperature of the recycled gas in the EGR by controlling a volume of the cooling liquid of the EGR. As shown in FIG. 3, the step S100 can include:

At step S110, obtaining a gas temperature and an intake flow of the air intake from the EGR, a liquid temperature of the liquid inlet and a liquid temperature of the liquid outlet.

At step S120, according to the gas temperature and the intake flow of the air intake, the liquid temperature of the liquid inlet and the liquid temperature of the liquid outlet, confirming a required volume of the cooling liquid for cooling the recycled gas by the EGR at the lowest gas temperature.

At step S130, according to the required volume of the cooling liquid for cooling the recycled gas by the EGR at the lowest gas temperature, adjusting the working power of the pump arranged in the liquid duct of the EGR.

According to law of conservation of energy, in the heat exchanger of the EGR, the energy required by cooling the gas in the EGR from a temperature T1 to a temperature T2 is equal to the energy released by cooling the cooling liquid in the EGR from a temperature T3 to a temperature T4. According to this, obtaining the gas temperature and the intake flow of the air intake, the liquid temperature of the liquid inlet, and the liquid temperature of the liquid outlet, and combining a specific heat of the gas and a specific heat of the cooling liquid, the required volume of the cooling liquid for cooling the recycled gas at the lowest gas temperature being entranced into the engine can be calculated.

Thereinto, the air intake, an air outlet, the liquid inlet, and the liquid outlet of the EGR can set temperature sensors, for transmitting the detected temperatures to the processor.

Exemplary, the required volume of the cooling liquid required for cooling the recycled gas to the set temperature by the EGR can be calculated by using the following formula:

$$Q_l = \frac{C_g * Q_g * (T_i - T_b)}{C_l * (T_{l2} - T_{l1})}$$

Thereinto, $Q_l$ is the required volume of the cooling liquid required for cooling the recycled gas to the set temperature by the EGR, $C_g$ is the specific heat of the gas in the air intake of the EGR, $Q_g$ is the intake flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

Figure 4:
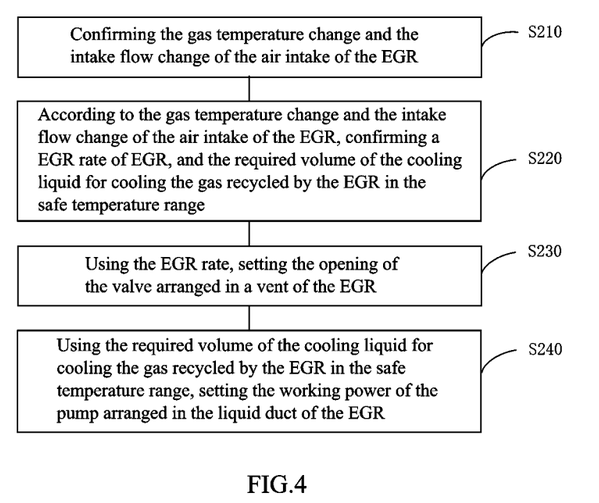
FIG. 4 is a schematic diagram according to a fourth embodiment of the present application.

In an exemplary embodiment, at the step S200, as shown in FIG. 4, according to a gas temperature change and an intake flow change of an air intake of the EGR, adjusting an opening of a valve arranged in a vent of the EGR and a working power of a pump arranged in a liquid duct of the EGR, for making the EGR to cool the gas recycled by the EGR in a safe temperature range required by the engine, includes:

At step S210, confirming the gas temperature change and the intake flow change of the air intake of the EGR.

At step S220, according to the gas temperature change and the intake flow change of the air intake of the EGR, confirming an EGR rate of EGR, and the required volume of the cooling liquid for cooling the gas recycled by the EGR in the safe temperature range.

At step S230, using the EGR rate, setting the opening of the valve arranged in a vent of the EGR.

At step S240, using the required volume of the cooling liquid for cooling the gas recycled by the EGR in the safe temperature range, setting the working power of the pump arranged in the liquid duct of the EGR.

Because the GPF/DPF is in the working state, the gas temperature change and the intake flow change of the air intake entranced into the EGR reflect a temperature change of the gas processed by the GPF/DPF and an air intake flow change entranced into the EGR. Thus, the EGR rate, can be obtained as follows: when early marking the GPF/DPF obtaining and recording EGR rate flows under different rotating speeds, powers, and the gas temperatures; when requiring to obtain the EGR rate, according to the current rotating speed and the power of the EGR, and the gas temperature of the air intake, confirming an exhaust gas rate. A standard flow is a desired exhaust gas volume under a set EGR rate of the system. The standard flow is used to calculate the cooling liquid volume for cooling the gas recycled by the EGR in the safe temperature range.

Exemplary, the required volume of the cooling liquid for cooling the gas recycled by the EGR in the safe temperature range, can be calculated by the following formula:

$$Q_l = \frac{C_g * Q * (T_i - T_b)}{C_l * (T_{l2} - T_{l1})}$$

Thereinto, $Q_l$ is the required volume of the cooling liquid for cooling the gas recycled by the EGR in the safe temperature range, $C_g$ is the specific heat of the gas of the air intake of the EGR, Q is the standard flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

Then according to the above step S210 to the step S240 the opening of the valve of the EGR and the working power of the pump of the EGR.

In an exemplary embodiment, under a condition of the gas temperature of the air intake of the EGR raising or the intake flow increasing, the processor implements the following operations:

confirming the EGR rate;

confirming the required volume of the cooling liquid for cooling the gas recycled by the EGR in the safe temperature range;

using the confirmed EGR rate, setting the opening of the valve arranged in the vent of the EGR;

using the required volume of the cooling liquid for cooling the gas recycled by the EGR in the safe temperature range, setting the working power of the pump arranged in the liquid duct of the EGR.

Exemplary, a condition of the gas temperature change and the intake flow change of the air intake of the EGR can be detected at regular intervals. If the gas temperature of the air intake of the EGR raising or the intake flow increasing, the above operations are continued to be executed. For example, the condition is detected every ten seconds, every one minute, or irregular interval time durations, and the like.

In an exemplary embodiment, under a condition of the gas temperature of the air intake of the EGR dropping or the intake flow decreasing, and the GPF/DPF does not stop working, or the gas temperature of the air intake of the EGR dropping or the intake flow decreasing, and the GPF/DPF stops working but the gas temperature of the air intake does not return in a normal temperature range of the air intake, the processor implements the following operations:

confirming the EGR rate;

confirming the required volume of the cooling liquid for cooling the gas recycled by the EGR in the safe temperature range;

using the confirmed EGR rate, setting the opening of the valve arranged in the vent of the EGR; and using the required volume of the cooling liquid for cooling the gas recycled by the EGR in the safe temperature range, setting the working power of the pump arranged in the liquid duct of the EGR.

Exemplary, a condition of the gas temperature change and the intake flow change of the air intake of the EGR can be detected at regular intervals. If the gas temperature of the air intake of the EGR raises or the intake flow increases, the above operations are continued to be executed. For example, the condition is detected every ten seconds, every one minute, or irregular interval time durations, and the like.

If the gas temperature of the air intake of the EGR drops or the intake flow decreases, and the GPF/DPF stops working but the gas temperature of the air intake returns in a normal temperature range of the air intake, the processor can stop adjusting the opening of the valve in the vent of the EGR and the working power of the pump arranged in the liquid duct of the EGR.

In an exemplary embodiment, after using the required volume of the cooling liquid for cooling the gas recycled by the EGR in the safe temperature range, setting the working power of the pump arranged in the liquid duct of the EGR, further includes: judging whether the temperature of the gas recycled by the EGR after passing through the heat exchanger is in the safe temperature range, if the temperature of the gas recycled by the EGR after passing through the heat exchanger is not within the safe temperature range, the working power of the pump keeps increasing until the temperature of the gas recycled by the EGR after passing through the heat exchanger is within the safe temperature range.

Figure 5:
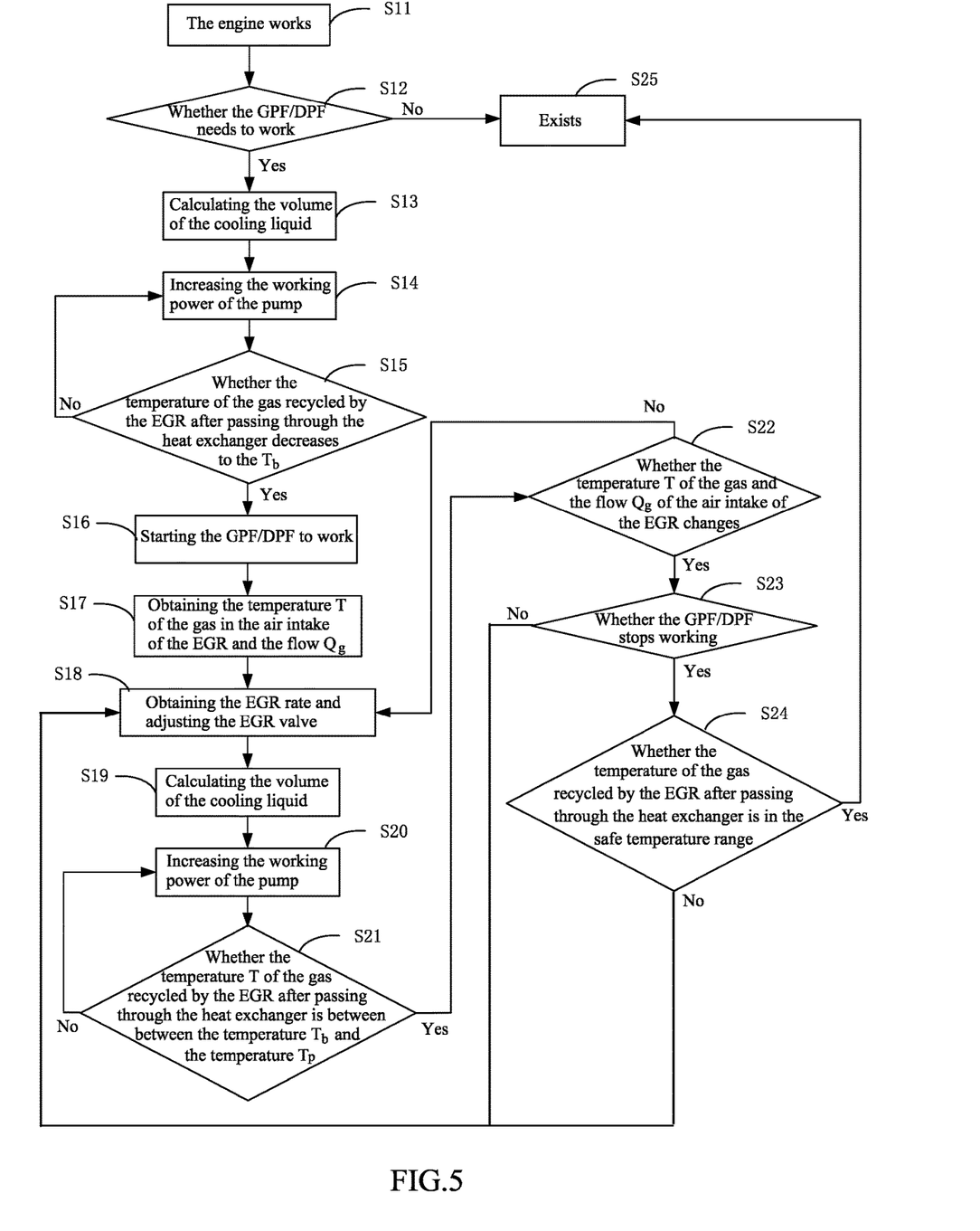
FIG. 5 is a schematic diagram showing application of an embodiment of the present disclosure.

FIG. 5 illustrates the flowchart of an example application of vehicle exhaust gas recirculation of the present application.

At step S11, the engine of the vehicle starts to work.

At step S12, the processor judges whether the GPF/DPF needs to work. If the GPF/DPF needs to work, the step S13 continues to execute. If the GPF/DPF does not need to work, the step S25 is executed.

At step S13, the processor calculates the volume of the cooling liquid. Exemplary, it is calculated according to the step S110 and the step S120.

At step S14, the processor increases a working power of the pump according to the calculated volume of the cooling liquid.

At step S15, the processor judges whether the temperature of the gas recycled by the EGR after passing through the heat exchanger decreases to the $T_b$. $T_b$ is the lowest temperature of the gas being entranced into the engine. If the temperature of the gas is lower than the $T_b$, it will cause the engine does not fully burn, an efficiency is low. If the temperature of the gas recycled by the EGR after passing through the heat exchanger does not reach the $T_b$, the step S14 is returned, the working power of the pump continues to increase. If the temperature of the gas recycled by the EGR after passing through the heat exchanger decreases to the $T_b$, the step S16 continues to execute.

At step S16, the processor starts the GPF/DPF to work.

At step S17, the processor obtains the temperature T of the gas of the air intake of the EGR and the flow $Q_g$.

At step S18, the processor obtains the EGR rate, according to the obtained temperature T of the gas of the air intake of the EGR and the flow $Q_g$, and adjusts an EGR valve according to the EGR rate.

At step S19, the processor calculates the required volume of the cooling liquid for cooling the gas recycled by the EGR between the $T_b$ and $T_p$, according to the obtained temperature T of the gas of the air intake of the EGR and the EGR rate.

At step S20, the processor increases the working power of the pump, according to the calculated volume of the cooling liquid.

At step S21, the processor judges whether the temperature T of the gas recycled by the EGR after passing through the heat exchanger is between the temperature $T_b$ and the temperature $T_p$. If between the temperature $T_b$ and the temperature $T_p$, the step S22 is executed. If not between the temperature $T_b$ and the temperature $T_p$, the step S20 is returned and executed, for continuing to increase the working power of the pump.

At step S22, the processor obtains the temperature T of the gas and the flow $Q_g$ of the air intake of the EGR again, and judges the condition of the gas temperature change and the intake flow change. If the gas temperature of the air intake of the EGR raises or the intake flow increases, the step S18 is returned and executed. If the gas temperature of the air intake of the EGR drops or the intake flow decreases, the step S23 continues to execute.

At step S23, the processor judges whether the GPF/DPF stops working. If the GPF/DPF stops working, the step S24 is executed. If the GPF/DPF does not stop working, the step S18 is returned and executed.

At step S24, the processor judges whether the temperature of the gas recycled by the EGR after passing through the heat exchanger is in the safe temperature range. If the temperature of the gas recycled by the EGR after passing through the heat exchanger is in the safe temperature range, the step S25 is executed. If the temperature of the gas recycled by the EGR after passing through the heat exchanger is not within the safe temperature range, the step S18 is returned and executed.

At step S25, the processor stops working.

Figure 6:
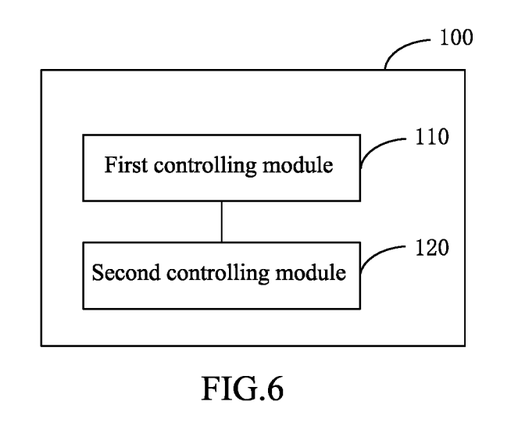
FIG. 6 is a schematic diagram according to a fifth embodiment of the present application.

FIG. 6 shows the structure diagram of the controlling apparatus of vehicle exhaust gas recirculation of the present application. In a vehicle, GPF/DPF of the vehicle processes the gas exhausted by the engine and exhausts to the exhaust channel, and the gas exhausted by the GPF/DPF can be recycled into EGR, the EGR uses the cooling liquid to decreases the temperature of the recycled gas and exhausts into the intake channel of the engine. As shown in FIG. 6, the apparatus 200 can includes:

a first controlling module 110, before the GPF/DPF starts to work, controls the EGR to cool the temperature of the recycled gas at a lowest gas temperature required being entranced into the engine.

a second controlling module 120, after the GPF/DPF starts to work, according to a gas temperature change and an intake flow change of an air intake of the EGR, adjusts an opening of a valve arranged in a vent of the EGR and a working power of a pump arranged in a liquid duct of the EGR, for making the EGR to cool the gas recycled by the EGR in a safe temperature range required by the engine.

Figure 7:
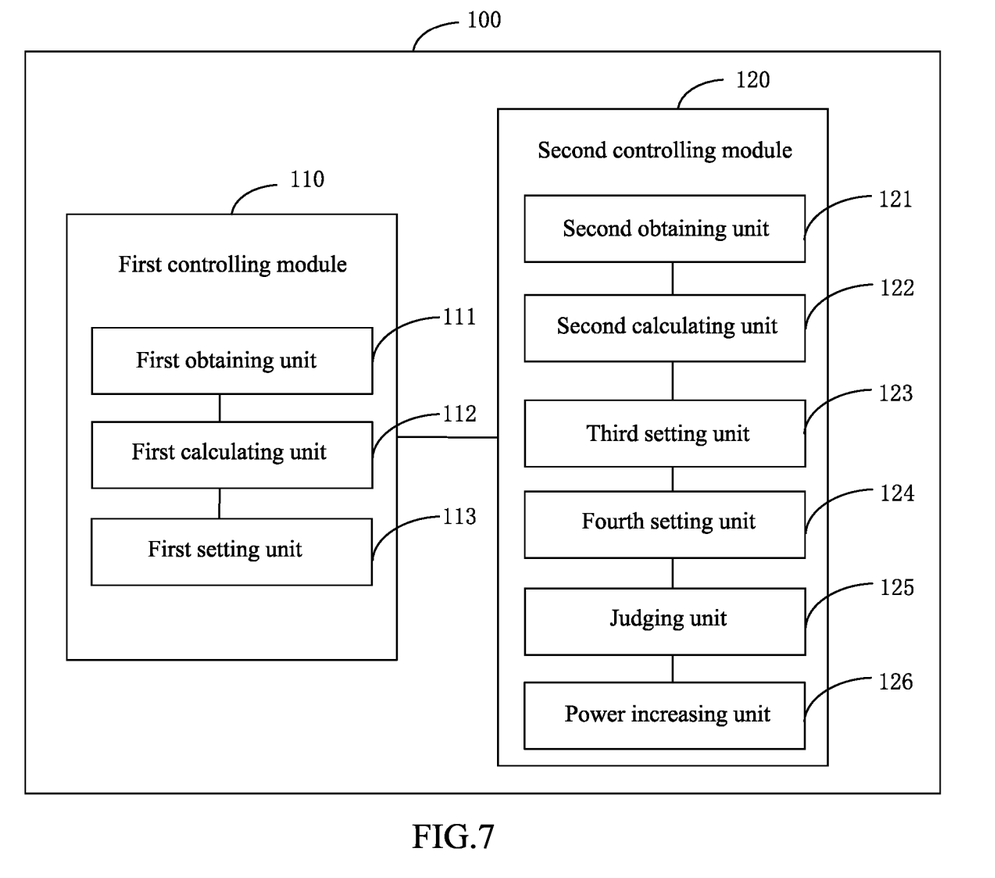
FIG. 7 is a schematic diagram according to a sixth embodiment of the present application.

Exemplary, as shown in FIG. 7, the first controlling module 110 includes:

a first obtaining unit 111, obtains a gas temperature and an intake flow of the air intake from the EGR, a liquid temperature of the liquid inlet and a liquid temperature of the liquid outlet;

a first calculating unit 112, according to the gas temperature and the intake flow of the air intake, the liquid temperature of the liquid inlet and the liquid temperature of the liquid outlet, confirms a required volume of the cooling liquid for cooling the recycled gas by the EGR at the lowest gas temperature; and a first setting unit 113, according to the required volume of the cooling liquid for cooling the recycled gas by the EGR at the lowest gas temperature, adjusts the working power of the pump arranged in the liquid duct of the EGR.

Exemplary, the formula used by the first calculating unit 112 is shown as follow:

$$Q_l = \frac{C_g * Q_g * (T_i - T_b)}{C_l * (T_{l2} - T_{l1})}$$

Thereinto, $Q_l$ is the required volume of the cooling liquid required for cooling the recycled gas to the set temperature by the EGR, $C_g$ is the specific heat of the gas of the air intake of the EGR, $Q_g$ is the intake flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

Exemplary, as shown in FIG. 7, the second controlling module 120 includes:

a second obtaining unit 121, confirms the gas temperature change and the intake flow change of the air intake of the EGR;

a second calculating unit 122, according to the gas temperature change and the intake flow change of the air intake of the EGR, confirms a EGR rate of EGR, and the required volume of the cooling liquid for cooling the gas recycled by the EGR in the safe temperature range;

a third setting unit 123, using the EGR rate, sets the opening of the valve arranged in a vent of the EGR;

a fourth setting unit 124, using the required volume of the cooling liquid for cooling the gas recycled by the EGR in the safe temperature range, sets the working power of the pump arranged in the liquid duct of the EGR.

Exemplary, the second calculating unit 122 also reconfirms the ERG rate under the condition of the gas temperature of the air intake of the EGR raising or the intake flow increasing, and reconfirms the required volume of the cooling liquid for cooling the gas recycled by the EGR in the safe temperature range. The third setting unit 123 sets the opening of the valve arranged in the vent of the EGR, using the confirmed EGR rate. The fourth setting unit 124 sets the working power of the pump arranged in the liquid duct of the EGR, using the required volume of the cooling liquid for cooling the gas recycled by the EGR in the safe temperature range.

Exemplary, the second calculating unit 122 also reconfirms the ERG rate and reconfirms the required volume of the cooling liquid for cooling the gas recycled by the EGR in the safe temperature range, under a condition of the gas temperature of the air intake of the EGR dropping or the intake flow decreasing, and the GPF/DPF does not stop working, or the gas temperature of the air intake of the EGR dropping or the intake flow decreasing, and the GPF/DPF stops working but the gas temperature of the air intake does not return in a normal temperature range of the air intake. The third setting unit 123 sets the opening of the valve arranged in the vent of the EGR, using the confirmed EGR rate. The fourth setting unit 124 sets the working power of the pump arranged in the liquid duct of the EGR, using the required volume of the cooling liquid for cooling the gas recycled by the EGR in the safe temperature range.

Exemplary, the second controlling unit 120 further includes:

a judging unit 125, judges whether the temperature of the gas recycled by the EGR after passing through the heat exchanger is in the safe temperature range after setting the working power of the pump arranged in the liquid duct of the EGR, according to the required volume of the cooling liquid for cooling the gas recycled by the EGR in the safe temperature range;

a power increasing unit 126, continues to increase the working power of the pump until the temperature of the gas recycled by the EGR after passing through the heat exchanger is in the safe temperature range.

Exemplary, the formula used by the second calculating unit 122 is shown as follow:

$$Q_l = \frac{C_g * Q * (T_i - T_b)}{C_l * (T_{l2} - T_{l1})}$$

Thereinto, $Q_l$ is the required volume of the cooling liquid for cooling the gas recycled by the EGR in the safe temperature range, $C_g$ is the specific heat of the gas of the air intake of the EGR, Q is the standard flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

Figure 8:
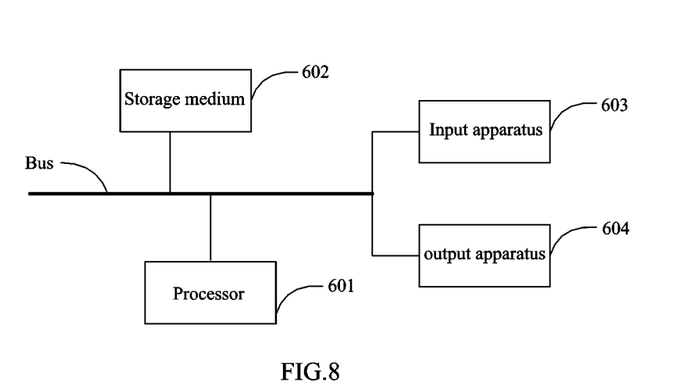
FIG. 8 is a block diagram of an electronic device implementing the controlling method of vehicle exhaust gas recirculation of the present application.

As shown in FIG. 8, it is a block diagram of an electronic device according to the controlling method of vehicle exhaust gas recirculation of the present application. The electronic device is intended to represent various forms of digital computers, such as laptop computers, desktop computers, workbenches, personal digital assistants, servers, blade servers, mainframe computers, and other suitable computers. The electronic devices can also represent various forms of mobile devices, such as personal digital processing, cellular phones, smart phones, wearable devices and other similar computing devices. The components, connections, relationships and their functions shown herein are used only as examples and are not intended to limit the implementation of the present application described and/or claimed herein.

As shown in FIG. 8, the electronic device includes: one or more processor 601, a storage medium 602, and interfaces for connecting components, including a high-speed interface and a low-speed interface. The components are connected with each other using different buses and can be installed on a common motherboard or in other manner. The processor 601 can process instructions executed within the electronic device, including instructions stored in or on the storage medium 602 to display a graphic information of the GUI on an external input/output device, such as a display device coupled to the interface. In other embodiments, a plurality of processors and/or buses may be used with a plurality of memories if necessary. Similarly, a plurality of electronic devices can be connected, and each device provides some of the necessary operations (for example, as a server array, a set of blade servers, or a multiprocessor system). An example of a processor 601 is shown in FIG. 8.

The storage medium 602 is the non-transient computer-readable storage medium provided in present disclosure. The storage medium 602 stores instructions that can be executed by at least one processor 601 to cause the at least one processor 601 to execute the method of controlling the exhaust gas recirculation provided by the present disclosure. The non-transient computer-readable storage medium of the present disclosure stores computer instructions causing the computer to perform the method of controlling the exhaust gas recirculation provided in the present disclosure.

The storage medium 602, as a non-transient computer-readable storage medium, can be used to store non-transient software programs, non-transient computer executable programs and modules, such as program instructions/modules corresponding to the method of controlling the exhaust gas recirculation in the embodiment of the present disclosure (for example, the first controlling module 110 and the second controlling module 120 shown in FIG. 6). The processor 601 executes various functional applications and data processing of the server by running non-transient software programs, instructions and modules stored in the storage medium 602, so as to perform the controlling method of vehicle exhaust gas recirculation in the embodiment of the above method.

The storage medium 602 may include a storage program area and a storage data area, wherein the storage program area may store an operating system and applications required by at least one function; the storage data area may store data created by the electronic devices according to the controlling method of vehicle exhaust gas recirculation. In addition, the storage medium 602 may include a high-speed random access memory and may also include a non-transient memory, such as at least one of disk storage device, flash memory device or other non-transient solid-state memory device. In some embodiments, the storage medium 602 may optionally include a memory remotely set relative to the processor 601 which can be connected to the electronic device of the controlling method of vehicle exhaust gas recirculation via a network. Examples of the above networks include, but are not limited to, Internet, intranets, local area networks, mobile communication networks, and combinations thereof.

The electronic device of the controlling method of vehicle exhaust gas recirculation may also include an input apparatus 603 and an output apparatus 604. The processor 601, the storage medium 602, the input apparatus 603 and the output apparatus 604 may be connected by buses or other means, an example of bus connection is shown in FIG. 8.

The input apparatus 603 may receive the input digital or character information and generate key signal inputs related to the user settings and functional control of the electronic device according to the controlling method of vehicle exhaust gas recirculation, such as touch screen, keypad, mouse, trackpad, touchpad, indicator lever, one or more mouse buttons, trackball, joystick, and the like. The output apparatus 604 may include a display device, an auxiliary lighting device (e.g., LED) and a tactile feedback device (e.g., vibrating motor) and the like. The display device may include, but not limited thereto, a liquid crystal display (LCD), a light emitting diode (LED) display and a plasma display. In some embodiments, the display device may be a touch screen.

Various embodiments of the systems and techniques described herein may be implemented in digital electronic circuit systems, integrated circuit systems, application specific integrated circuits (ASIC), computer hardware, firmware, software, and/or combinations thereof. These embodiments may be implemented in one or more computer programs that may be executed and/or interpreted on a programmable system including at least one programmable processor, the programmable processor may be a dedicated or general-purpose programmable processor that can receive data and instructions from a storage system, at least one input device, and at least one output device, and transmit the data and instructions to the storage system, at least one input device and at least one output device.

These computing programs (also known as programs, software, applications, or codes) may include machine instructions for programmable processors, and these computing programs can be implemented using advanced processes and/or object-oriented programming languages, and/or assembly/machine languages. As used herein, the terms "machine-readable medium" and "computer-readable medium" refer to any computer program product, device, and/or apparatus for providing machine instructions and/or data to a programmable processor (e.g., magnetic disk, optical disc, memory, programmable logic device (PLD)), and a machine-readable medium that receives machine instructions as machine-readable signals. The term "machine readable signal" refers to any signal which is used to provide machine instructions and/or data to a programmable processor.

In order to provide interaction with the user, the system and techniques described herein can be implemented on a computer having a display device (such as cathode ray tube (CRT) or liquid crystal display (LCD) monitor) for displaying information to the user, and a keyboard and pointing device (e.g., a mouse or trackball) through which the user can provide input to the computer. Other types of devices can also be used to provide interaction with the user; for example, the feedback provided to the user may be any form of sensory feedback (e.g., visual feedback, auditory feedback, or tactile feedback); and input from the user in any form (including sound input, voice input, or tactile input) can be received.

The systems and techniques described herein may be implemented in a computing system that includes background components (for example, a data server), or a computing system that includes middleware components (for example, an application server), or a computing system that includes front-end components (for example, a user computer with a graphical user interface or a web browser, where the user can interact through the graphical user interface or the web browser according to the embodiments of the systems and technologies described herein), or a computing system that includes any combination of such background components, middleware components, or front-end components. The components of the system can be connected to each other by digital data communication in any form or medium (for example, a communication network). Examples of communication networks include local area network (LAN), wide area network (WAN) and Internet.

A computer system may include clients and servers. Clients and servers are generally far away from each other and usually interact through communication networks. The relationship between the client and the server is established by running computer programs on the corresponding computers having a client-server relationship with each other.

According to the technical solutions in the embodiment of the present application, the GPF/DPF is associated controlled with a cooling system of the EGR. By using the above technical solutions, the recycled exhaust gas temperature and the EGR rate is ensured to be in a suitable range.

It should be understood that steps shown above can be reordered, added, or deleted in various forms. For example, the steps recorded in the present application can be executed in parallel, sequentially or in different order, which is not limited herein as long as the expected results of the technical solutions disclosed in the present application can be achieved.

The protective scope of the present disclosure is not limited by the above exemplary embodiments. It should be apparent to those skilled in the art that various modifications, combinations, sub-combinations and replacements may be made according to design requirements and other factors. Those modifications, equivalent replacements and improvements should be made without departing from the spirit and principle of the present disclosure, and shall fall within the scope of the present disclosure.

What is claimed is:

1. A controlling method of vehicle exhaust gas recirculation, a gasoline particulate filter (GPF) or a diesel particulate filter (DPF) of a vehicle processes the gas exhausted by an engine and exhausts to an exhaust channel, and the exhausted gas by the GPF/DPF can be recycled into an exhaust gas re-circulation (EGR), the EGR cools the recycled gas using a cooling liquid and exhausts into an air intake of the engine, the method comprises:
    before the GPF/DPF starts to work, controlling the EGR to cool the temperature of the recycled gas at a lowest gas temperature required being entranced into the engine; and
    after the GPF/DPF starts to work, according to a gas temperature change and an intake flow change of an air intake of the EGR, adjusting an opening of a valve arranged in a vent of the EGR and a working power of a pump arranged in a liquid duct of the EGR, for making the EGR to cool the gas recycled by the EGR in a safe temperature range required by the engine.

2. The method of claim 1, wherein the step of controlling the EGR to cool the temperature of the recycled gas at the lowest gas temperature required being entranced into the engine, comprises:
obtaining a gas temperature and an intake flow of the air intake from the EGR, a liquid temperature of the liquid inlet and a liquid temperature of the liquid outlet;
according to the gas temperature and the intake flow of the air intake, the liquid temperature of the liquid inlet and the liquid temperature of the liquid outlet, confirming a required volume of the cooling liquid for cooling the recycled gas by the EGR at the lowest gas temperature; and
according to the required volume of the cooling liquid for cooling the recycled gas by the EGR at the lowest gas temperature, adjusting the working power of the pump arranged in the liquid duct of the EGR.

3. The method of claim 2, wherein the required volume of the cooling liquid for cooling the recycled gas by the EGR at the lowest gas temperature is calculated by using the following formula:

$$Q_l = \frac{C_g * Q_g * (T_i - T_b)}{C_l * (T_{l2} - T_{l1})}$$

wherein $Q_l$ is the required volume of the cooling liquid required for cooling the recycled gas to the set temperature by the EGR, $C_g$ is the specific heat of the gas in the air intake of the EGR, $Q_g$ is the intake flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

4. The method of claim 1, wherein the step of adjusting the opening of the valve arranged in the vent of the EGR and the working power of the pump arranged in the liquid duct of the EGR, for making the EGR to cool the gas recycled by the EGR in the safe temperature range required by the engine, comprises:
confirming the gas temperature change and the intake flow change of the air intake of the EGR;
according to the gas temperature change and the intake flow change of the air intake of the EGR, confirming a EGR rate of EGR, and the required volume of the cooling liquid for cooling the gas recycled by the EGR in the safe temperature range;
using the EGR rate, setting the opening of the valve arranged in the vent of the EGR; and
using the required volume of the cooling liquid for cooling the gas recycled by the EGR in the safe temperature range, setting the working power of the pump arranged in the liquid duct of the EGR.

5. The method of claim 4, wherein the method further comprises:
under a condition of the gas temperature of the air intake of the EGR raising or the intake flow increasing, reconfirming the EGR rate, and reconfirming the required volume of the cooling liquid for cooling the gas recycled by the EGR in the safe temperature range, and using the reconfirmed EGR rate, setting the opening of the valve arranged in the vent of the EGR, and using the reconfirmed required volume of the cooling liquid for cooling the gas recycled by the EGR in the safe temperature range, setting the working power of the pump arranged in the liquid duct of the EGR.

6. The method of claim 4, wherein the method further comprises:
under a condition of the gas temperature of the air intake of the EGR dropping or the intake flow decreasing, and the GPF/DPF does not stop working, or the gas temperature of the air intake of the EGR dropping or the intake flow decreasing, and the GPF/DPF stops working but the gas temperature of the air intake does not return in a normal temperature range of the air intake, reconfirming the EGR rate, and reconfirming the required volume of the cooling liquid for cooling the gas recycled by the EGR in the safe temperature range, and using the reconfirmed EGR rate, setting the opening of the valve arranged in the vent of the EGR, and using the reconfirmed required volume of the cooling liquid for cooling the gas recycled by the EGR in the safe temperature range, setting the working power of the pump arranged in the liquid duct of the EGR.

7. The method of claim 4, wherein after the step of using the required volume of the cooling liquid for cooling the gas recycled by the EGR in the safe temperature range, setting the working power of the pump arranged in the liquid duct of the EGR, the method further comprises:
judging whether the temperature of the gas recycled by the EGR after passing through the heat exchanger is in the safe temperature range;
if the temperature of the gas recycled by the EGR after passing through the heat exchanger is not within the safe temperature range, the working power of the pump keeps increases, until the temperature of the gas recycled by the EGR after passing through the heat exchanger is in the safe temperature range.

8. The method of claim 5, wherein the required volume of the cooling liquid for cooling the recycled gas in the safe temperature range by the EGR is calculated by using the following formula:

$$Q_l = \frac{C_g * Q * (T_i - T_b)}{C_l * (T_{l2} - T_{l1})}$$

wherein $Q_l$ is the required volume of the cooling liquid for cooling the gas recycled by the EGR in the safe temperature range, $C_g$ is the specific heat of the gas of the air intake of the EGR, Q is the standard flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

9. A controlling apparatus, a gasoline particulate filter (GPF) or a diesel particulate filter (DPF) of a vehicle processes the gas exhausted by an engine and exhausts to an exhaust channel, and the exhausted gas by the GPF/DPF can be recycled into an exhaust gas re-circulation (EGR), the EGR cools the recycled gas using a cooling liquid and exhausts into an air intake of the engine; the apparatus comprises:
a first controlling module, before the GPF/DPF starts to work, controls the EGR to cool the temperature of the recycled gas at a lowest gas temperature required being entranced into the engine; and a second controlling module, after the GPF/DPF starts to work, according to a gas temperature change and an intake flow change of an air intake of the EGR, adjusts an opening of a valve arranged in a vent of the EGR and a working power of a pump arranged in a liquid duct of the EGR, for making the EGR to cool the gas recycled by the EGR in a safe temperature range required by the engine.

10. An electronic device comprises:

at least one processor; and a storage medium communicated with the at least one processor;

wherein the storage medium stores instructions the processor executes the instructions in the storage medium to implement the following steps:

before the GPF/DPF starts to work, controlling the EGR to cool the temperature of the recycled gas at a lowest gas temperature required being entranced into the engine; and after the GPF/DPF starts to work, according to a gas temperature change and an intake flow change of an air intake of the EGR, adjusting an opening of a valve arranged in a vent of the EGR and a working power of a pump arranged in a liquid duct of the EGR, for making the EGR to cool the gas recycled by the EGR in a safe temperature range required by the engine.

11. The electronic device of claim 10, wherein the step of controlling the EGR to cool the temperature of the recycled gas at a lowest gas temperature required being entranced into the engine comprises:

obtaining a gas temperature and an intake flow of the air intake from the EGR, a liquid temperature of the liquid inlet and a liquid temperature of the liquid outlet;

according to the gas temperature and the intake flow of the air intake, the liquid temperature of the liquid inlet and the liquid temperature of the liquid outlet, confirming a required volume of the cooling liquid for cooling the recycled gas by the EGR at the lowest gas temperature; and according to the required volume of the cooling liquid for cooling the recycled gas by the EGR at the lowest gas temperature, adjusting the working power of the pump arranged in the liquid duct of the EGR.

12. The electronic device of claim 10, wherein the required volume of the cooling liquid for cooling the recycled gas by the EGR at the lowest gas temperature is calculated by using the following formula:

$$Q_l = \frac{C_g * Q_g * (T_i - T_b)}{C_l * (T_{l2} - T_{l1})}$$

wherein $Q_l$ is the required volume of the cooling liquid required for cooling the recycled gas to the set temperature by the EGR, $C_g$ is the specific heat of the gas in the air intake of the EGR, $Q_g$ is the intake flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

13. The electronic device of claim 10, wherein the step of adjusting the opening of the valve arranged in the vent of the EGR and the working power of the pump arranged in the liquid duct of the EGR, for making the EGR to cool the gas recycled by the EGR in the safe temperature range required by the engine, comprises:

confirming the gas temperature change and the intake flow change of the air intake of the EGR;

according to the gas temperature change and the intake flow change of the air intake of the EGR, confirming a EGR rate of EGR, and the required volume of the cooling liquid for cooling the gas recycled by the EGR in the safe temperature range;

using the EGR rate, setting the opening of the valve arranged in the vent of the EGR; and using the required volume of the cooling liquid for cooling the gas recycled by the EGR in the safe temperature range, setting the working power of the pump arranged in the liquid duct of the EGR.

14. The electronic device of claim 13, wherein the processor further:

under a condition of the gas temperature of the air intake of the EGR raising or the intake flow increasing, reconfirming the EGR rate, and reconfirming the required volume of the cooling liquid for cooling the gas recycled by the EGR in the safe temperature range, and using the reconfirmed EGR rate, setting the opening of the valve arranged in the vent of the EGR, and using the reconfirmed volume of the cooling liquid for cooling the gas recycled by the EGR in the safe temperature range, setting the working power of the pump arranged in the liquid duct of the EGR.

15. The electronic device of claim 13, wherein the processor further:

under a condition of the gas temperature of the air intake of the EGR dropping or the intake flow decreasing, and the GPF/DPF does not stop working, or the gas temperature of the air intake of the EGR dropping or the intake flow decreasing, and the GPF/DPF stops working but the gas temperature of the air intake does not return in a normal temperature range of the air intake, reconfirming the EGR rate, and reconfirming the required volume of the cooling liquid for cooling the gas recycled by the EGR in the safe temperature range, and using the reconfirmed EGR rate, setting the opening of the valve arranged in the vent of the EGR, and using the reconfirmed required volume of the cooling liquid for cooling the gas recycled by the EGR in the safe temperature range, setting the working power of the pump arranged in the liquid duct of the EGR.

16. The electronic device of claim 13, the processor further:

judging whether the temperature of the gas recycled by the EGR after passing through the heat exchanger is in the safe temperature range;

if the temperature of the gas recycled by the EGR after passing through the heat exchanger is not within the safe temperature range, the working power of the pump keeps increases, until the temperature of the gas recycled by the EGR after passing through the heat exchanger is in the safe temperature range.

17. The electronic device of claim 14, wherein the required volume of the cooling liquid required for cooling the recycled gas in the safe temperature range by the EGR can be calculated by using the following formula:

$$Q_l = \frac{C_g * Q * (T_i - T_b)}{C_l * (T_{l2} - T_{l1})}$$

wherein $Q_l$ is the required volume of the cooling liquid for cooling the gas recycled by the EGR in the safe temperature range, $C_g$ is the specific heat of the gas of the air intake of the EGR, Q is the standard flow of the air intake of the EGR, $T_i$ is the gas temperature of the air intake of the EGR, $T_b$ is the lowest gas temperature of the recycled gas being entranced into the engine by the EGR, $C_l$ is the specific heat of the cooling liquid, $T_{l2}$ is the liquid temperature of the liquid outlet of the EGR, $T_{l1}$ is the liquid temperature of the liquid inlet of the EGR.

* * * * *